United States Patent
Allen et al.

(10) Patent No.: US 11,735,019 B2
(45) Date of Patent: Aug. 22, 2023

(54) SYSTEM AND METHOD FOR INCREASED EXIT INTERROGATION OF RFID TAGS

(71) Applicant: SENSORMATIC ELECTRONICS, LLC, Boca Raton, FL (US)

(72) Inventors: John A. Allen, Pompano Beach, FL (US); Michael Del Busto, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 142 days.

(21) Appl. No.: 17/162,724

(22) Filed: Jan. 29, 2021

(65) Prior Publication Data

US 2021/0241593 A1    Aug. 5, 2021

Related U.S. Application Data

(60) Provisional application No. 62/968,956, filed on Jan. 31, 2020.

(51) Int. Cl.
| | | |
|---|---|---|
| *G08B 13/24* | (2006.01) | |
| *G06K 7/10* | (2006.01) | |
| *H04B 7/0417* | (2017.01) | |

(52) U.S. Cl.
CPC ..... *G08B 13/2468* (2013.01); *G06K 7/10099* (2013.01); *G08B 13/2417* (2013.01); *H04B 7/0421* (2013.01)

(58) Field of Classification Search
None
See application file for complete search history.

(56) References Cited

U.S. PATENT DOCUMENTS

| | | | | |
|---|---|---|---|---|
| 7,873,326 | B2 * | 1/2011 | Sadr | H01Q 21/29 370/335 |
| 8,890,657 | B2 * | 11/2014 | Lin | G06F 3/012 340/572.1 |
| 10,140,486 | B1 * | 11/2018 | Lavery | G07G 3/003 |
| 10,140,829 | B1 * | 11/2018 | Calvarese | G08B 13/246 |
| 11,017,648 | B2 * | 5/2021 | Reyes | G08B 13/2448 |
| 2005/0073411 | A1 | 4/2005 | Butler | |

(Continued)

FOREIGN PATENT DOCUMENTS

| | | |
|---|---|---|
| JP | 2016181173 A | 10/2016 |
| JP | 2017130209 A * | 7/2017 |

(Continued)

OTHER PUBLICATIONS

International Search Report and Written Opinion issued in International Patent Application No. PCT/US2021/015951 dated May 14, 2021.

*Primary Examiner* — Fekadeselassie Girma
(74) *Attorney, Agent, or Firm* — ArentFox Schiff LLP (57) ABSTRACT

In an aspect, the present disclosure includes a system for interrogating a person exiting a store. The system comprises one or more pedestals positioned to define an exit portal leading to a point of exit, one or more mmWave sensors, fixedly positioned near the point of exit, configured to receive one or more reflected mmWave beams from a person approaching the point of exit and triggering an interrogation of a security tag; and one or more security tag readers, fixedly positioned with the one or more pedestals, configured to read data from the security tag passing through the exit portal.

17 Claims, 3 Drawing Sheets

(56) References Cited

U.S. PATENT DOCUMENTS

| | | | | |
|---|---|---|---|---|
| 2009/0322489 A1* | 12/2009 | Jones | ................ | G06V 10/24 |
| | | | | 340/10.3 |
| 2010/0207738 A1* | 8/2010 | Bloy | ................ | H01Q 3/36 |
| | | | | 342/368 |
| 2012/0075101 A1* | 3/2012 | Austin | ................ | G01P 13/00 |
| | | | | 340/572.1 |
| 2016/0294040 A1* | 10/2016 | Blair | ................ | H01Q 1/22 |
| 2017/0220787 A1* | 8/2017 | Inokuchi | ................ | G06F 21/32 |
| 2018/0110923 A1* | 4/2018 | Kaplan | ................ | A61M 5/20 |
| 2019/0034855 A1* | 1/2019 | Halioris | ................ | G06Q 10/1091 |
| 2019/0204437 A1* | 7/2019 | Park | ................ | G01S 13/584 |
| 2021/0080885 A1* | 3/2021 | Akazawa | ................ | G03G 15/5091 |

FOREIGN PATENT DOCUMENTS

| | | | |
|---|---|---|---|
| KR | 20150134376 A | * | 12/2015 |
| WO | 2006081615 A1 | | 8/2006 |

* cited by examiner

SYSTEM AND METHOD FOR INCREASED EXIT INTERROGATION OF RFID TAGS

CROSS-REFERENCE TO RELATED APPLICATIONS

The present application claims priority to and benefits from U.S. Provisional Application No. 62/968,956 filed on Jan. 31, 2020, entitled "System and Method for Increased Exit Interrogation of RFID Tags," the content of which is incorporated by reference in its entirety.

FIELD OF THE INVENTION

The present disclosure relates to radio frequency identification (RFID) tags and more particularly to increasing exit interrogation of RFID tags.

BACKGROUND OF THE INVENTION

RFID systems and/or Electronic article surveillance ("EAS") systems are commonly used in retail stores and other settings to prevent unauthorized removal of goods from a protected area. Typically, a detection system is configured at an exit from the protected area, which comprises one or more transmitters and antennas ("pedestals") capable of generating an electromagnetic field across the exit, known as an "interrogation zone." Articles to be protected are tagged with a security tag, e.g., an EAS tag (or marker) and/or an RFID tag that, when activated, generates a response signal when passed through the interrogation zone. An antenna and receiver in the same or another "pedestal" detects this response signal and may generate an alarm if the security tag has not been accounted for.

Acousto Magnetic (AM) systems are commonly used for EAS tag detection and are well known in the art. The detectors in an AM system emit periodic bursts at 58 kHz, which causes a detectable resonant response in an EAS tag. Similarly, detectors in an RFID system emit periodic bursts in the radio frequency range which causes a detectable resonant response in an RFID tag. There are "dual tech" tags which include an EAS tag and an RFID tag in an integrated tag or an integrated tag having EAS tag capabilities and RFID tag capabilities. The detectors in a dual tech system emit periodic bursts at 58 kHz and emit periodic bursts in the radio frequency range which causes detectable resonant responses by the dual tech tag.

Retailers (e.g., apparel retailers) have deployed security tags in stores to track product movements as they arrive at stores, are placed on display on the sales floor, and are sold. The security tags may be used with a security system to detect inventory changes and/or possible loss events. For example, security tags may be read by an exit system to determine whether a tagged item is exiting the retail location. A security tag can be read from up to several feet away and does not need to be within direct line-of-sight of the reader to be tracked.

Security pedestals employing security tag technology are placed at store exits. The wider the store exit, the more pedestals that are needed. For example, a self-standing store may employ multiple pedestals to cover the store exits. In a strip mall or a mall having multiple stores, each store may have their store exits close to another store's exits. Thus, a store's security tag system may receive security tag interrogation signals from a store or stores next door. In a mall, a store may have exits on multiple floors, with the security tag system on one floor receiving security tag interrogation signals from the security tag system on the other floor. Due to the use of multiple pedestals at a store exit typically results in the security tag system (e.g., pedestals) having limited interrogation time due to synchronization of transmission with other RFID readers. For example, due to interrogation signals emitted from multiple pedestals, the interrogation signals may cause interference problems with other pedestals.

Thus, there is a need in the art for reducing signals emitted from multiple pedestals which cause interference with other pedestals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a system for interrogating a person exiting a store. The system comprises one or more pedestals positioned to define an exit portal leading to a point of exit, one or more mmWave sensors, fixedly positioned near the point of exit, configured to receive one or more reflected mmWave beams from a person approaching the point of exit and triggering an interrogation of one or more security tag, and one or more security tag readers, fixedly positioned with the one or more pedestals, configured to read data from the security tag passing through the exit portal.

In a further example, a method for interrogating a person exiting a store is disclosed. In yet another aspect, a non-transitory computer-readable medium is provided including code executable by one or more processors for interrogating a person exiting a store is disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The present disclosure provides systems and methods for increased exit interrogation of security tags. By incorporating mmWave technology into a pedestal or in an overhead detection system, the pedestal or overhead detection system may be able to detect an approaching person exiting a store and trigger a security tag system to interrogate the person for security tags. For example, the pedestal or overhead detection system may transmits one or more mmWave beams and receives one or more reflected mmWave beams from a person approaching an exit. The reflected beam or reflected beams may trigger one or more pedestals to emit one or more interrogation signals. For example, less than all of the pedestals are triggered, e.g., one or more selected pedestals are triggered. For example, the one or more pedestals may not be emitting one or more interrogation signals until triggered. By only triggering the one or more pedestals, less interrogation signals are transmitted compared to conventional security tag systems that emit interrogation signals on a periodic basis or continuous basis. In one or more embodiments, depending on which pedestal or overhead detection system detects the approaching person, one or more selected pedestals may emit interrogation signals. The one or more selected pedestals may emit interrogation signals for a predetermined time or until the person has passed through the pedestals. Although, the described embodiment is described using mmWave technology other technology may be used. For example, video, laser, infrared or other technology to detect an approaching person may be used.

Figure 1:
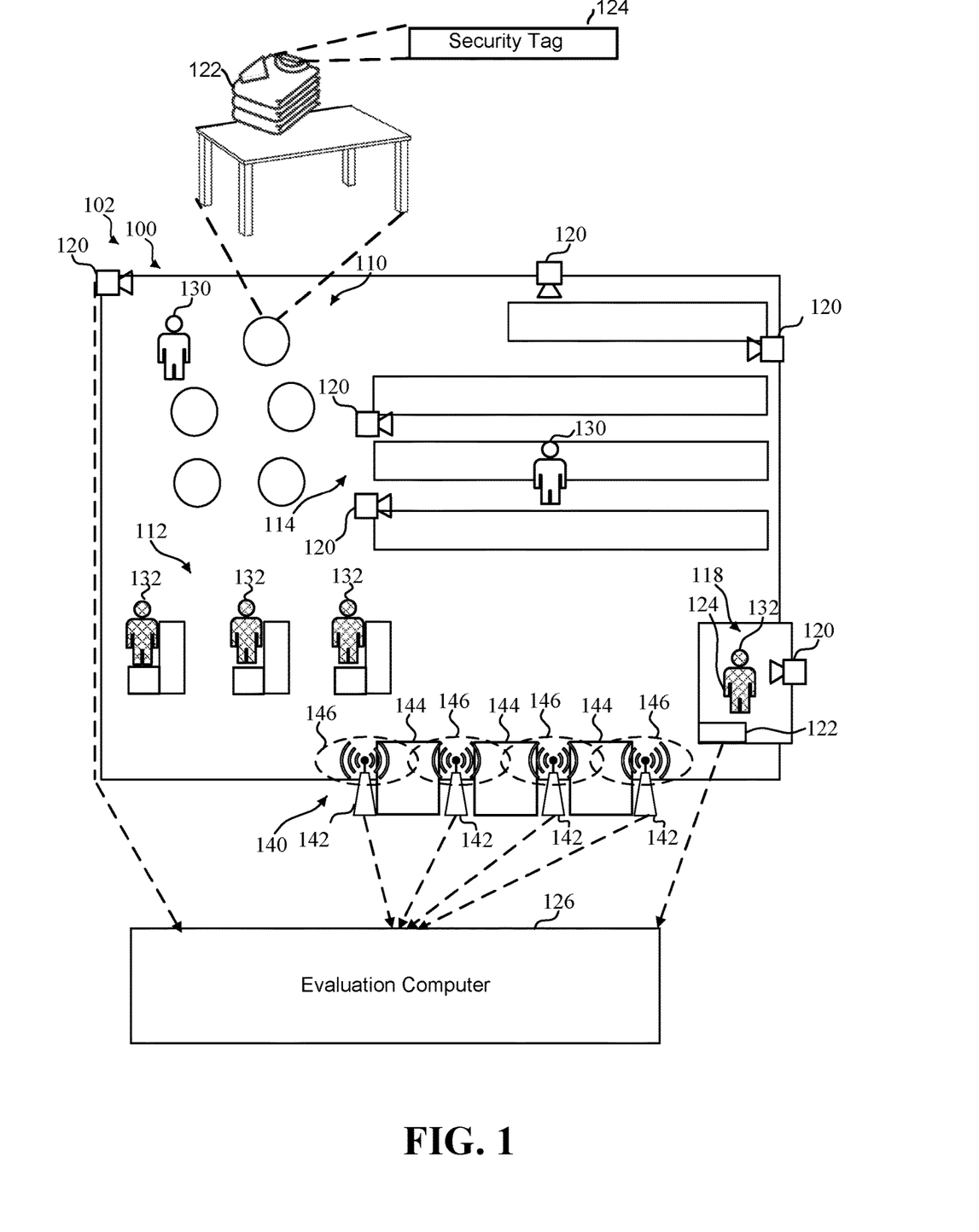
FIG. 1 is a schematic diagram of an example retail location including a first example of a security system.

Referring now to FIG. 1, an example retail location 100 includes multiple regions where tagged products may be located. For example, the retail location 100 may include an open display area 110, a front end 112, aisles 114, and a security room 118. Customers 130 may be located within the different regions or zones within the store and/or immediately outside the store. Workers 132 may be stationed at locations such as check out registers and the security room 118. A person of skill in the art would understand that the disclosed systems and methods are applicable to a variety of retail locations and the present disclosure is not limited to the example retail location or areas.

As discussed above, retailers (e.g., apparel retailers) have deployed security systems, such as EAS and/or RFID systems, in stores using security tags to track product movements, such as when the products arrive at a store, are placed on display on the sales floor, and/or are sold. By adopting security tags, retailers may be able to reduce the amount of time that the store employees spend counting the inventory (e.g., manually counting inventor that is on the floor and in stock room), as well as increase merchandise visibility within each store, thereby enabling shoppers in the store and online to find what they seek. Security systems may use different frequency signals to read and capture information stored on a tag attached to an object such as a good, product, or merchandise. For example, security tags may be used with a security system to detect inventory changes and/or possible loss events. For example, one or more security tags may be read by an exit system to determine whether a tagged item 122 is exiting the retail location. A security tag (e.g., tag 124) can be read from up to several feet away and does not need to be within direct line-of-sight of the reader to be tracked.

A security system may include one or more security tags or labels 124 (e.g., an EAS tag, RFID tag or dual tech tag) and a reader (e.g., exit system 140). Each security tag is embedded with at least one transmitter and at least one receiver, e.g., an EAS transmitter and EAS receiver, RFID transmitter and RFID receiver, or both. Each security tag may further contain the specific serial number for each specific object (e.g., an electronic product code (EPC)). For example, in one implementation, a security tag may include multiple memory banks such as a reserved memory, EPC memory, tag identification (TID) memory, and user memory. The reserved memory bank may include an access password and a kill password. The EPC memory may include the EPC, a protocol control, and a cyclic redundancy check value. The TID memory may include a tag identification. The user memory may store custom data.

To read the information encoded on a security tag 124, a two-way radio transmitter-receiver called an interrogator or reader (e.g., exit system 140) emits a signal to the security tag using one or more antennas, antenna panels or antenna arrays (e.g., internal antennas). The reader 140 may apply filtering to indicate what memory bank the security tag 124 should use to respond to the emitted signal. The security tag 124 may respond with the information (e.g., EPC value or serial number) written in the memory bank. The security tag data set may include any information stored on the security tag 124 as well as information about reading the security tag 124. For example, the security tag data set may include: a timestamp, a location, a signal transmission power, a received signal strength indication (RSSI), and an identifier of the reader 140. The security tag 124 may be a passive tag or a battery powered security tag. A passive security tag may use the interrogator or receiver's 140 wave energy to relay the stored information back to the interrogator. In contrast, a battery powered security tag 124 may be embedded with a battery that powers the relay of information.

The security system 102 may include an exit system 140, multiple cameras 120, and an evaluation computer 126. The exit system 140 may include multiple sensors 142 located near exits 144. The multiple sensors 142 may define an exit or point of exit. For example, the example retail location 100 may include three exits 144 that are relatively narrow. The sensors 142 may be located on each side of the exits 144. For example, in an implementation, the sensors 142 may include at least one security tag reader including an antenna that generates a tag detection field 146. Each security tag reader may be fixedly positioned with the sensor 142 or pedestal. For example, each security tag reader may be positioned or fastened to the sensor 142 or pedestal. Generally, the sensors 142 may be configured (e.g., by setting a power level) such that the tag detection fields 146 cover the exits 144 to detect tags moving through the exits. Although the sensors 142 are illustrated as pedestals adjacent the exits 144, sensors 142 may be located on the floor and/or the ceiling. As explained below in more detail, the sensors 142 may include mmWave technology to detect a person.

The cameras 120 may be located in or near the exit system 140 or may be located in other regions of retail location 100. Each camera 120 may be a digital video camera such as a security camera. The multiple cameras 120 may be located throughout the retail location 100. Each of the cameras 120 may provide a constant video feed of one or more of the areas of the retail location 100. The cameras 120 may generally be oriented in a default direction to capture a particular view of the retail location 100 where activity is expected, but one or more of the cameras 120 may be mounted on a gimbal that allows rotation and panning of the respective camera 120. For example, the security system 102 may move a camera 120 to maintain the field of view of the camera 120 on a customer 130. In another aspect, the security system 102 may allow manual control over one or more cameras 120. In an aspect, the security system 102 may be integrated with one or more other systems, and the video feed of the cameras 120 may be used for multiple purposes.

The evaluation computer 126 may be a computer device programmed to evaluate at least exit system measurements from the sensors 142. The evaluation computer 126 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing exist system measurements.

An exit system 140 may include a mmWave sensor 142 or mmWave technology. For example, the mmWave sensor 142 or mmWave technology may include a mmWave transmitter, a mmWave receiver and one or more antennas, antenna panels or antenna arrays. Each mmWave sensor 142 may be fixedly positioned with the pedestal. For example, mmWave sensor 142 may be positioned or fastened to the pedestal. The mmWave transmitter may transmit one or more mmWave beams (e.g., at about 60 GHz) via the one or more antennas and receive one or more reflected mmWave beams via the one or more antennas. The one or more mmWave beams may be reflected off of a person. The one or more reflected mmWave beams may be compared to a threshold to determine if a person is detected. For example, the received signal strength of the one or more reflected mmWave beams is compared to a threshold to determine if a person is detected. The comparison may be done at the pedestal (e.g., by a processor or a combination of hardware and software) and/or may be done by a processor of the evaluation computer 126. For example, a transceiver of the pedestal may transfer the one or more reflected mmWave beams to the evaluation computer 126 via a wired or wireless communication link for processing.

In one or more embodiments, the camera 120 may include a mmWave sensor 142 and perform similar functions as described above. In one or more embodiments, a sensor system, overhead system or antenna system may include a mmWave sensor 142, e.g., a mmWave transmitter, a mmWave receiver and one or more antennas and perform similar functions as described above. The sensor system, overhead system or antenna system may be mounted in the store in a similar manner as the cameras 120.

Once a person is detected, the security tag system of one or more pedestals or sensors 144 may be triggered. For example, when a person approaches an exit, the mmWave sensor 142 detects the person and triggers one security tag system sensors 144 to emit interrogation signals. For example, if one set of pedestals is at a store exit and the mmWave sensor 142 detects the person, the security tag system sensors 144 may emit interrogation signals to detect one or more security tags.

In one or more embodiments, the security tag system sensors 144 may include one or more antennas, antenna panels or antenna arrays. The security tag system may use beam steering to follow the person and interrogate the person more frequently. For example, using phase array antennas the security tag system sensors 144 may trigger one or more antennas or phase antennas to steer one or more beams towards the person exiting the store. By steering the one or more beams towards the moving person, e.g., tracking the person as the person exits the store, the security tag system sensors 144 increases the number of reads on the person. By using such a system, the security tag system sensors 144 may maximize the number of reads on the person. In one or more embodiments, the security tag system sensors 144 may initially use an increased power of the emitted interrogation signals and decrease the power of the emitted interrogation signals as the person gets closer to the security tag system sensors 144. By initially using an increased power of the emitted interrogation signals, the security tag system sensors 144 may increase the number of reads on the person. By using such a system, the security tag system sensors 144 may maximize the number of reads on the person.

In some implementations, the security tag system sensors 144 may include more than one transmitter. If the mmWave sensor 142 detects the person approaching a first exit, the security tag system sensors 144 may steer the transmitters near the first exit (within a threshold distance, such as 1 meter (m), 2 m, 5 m, etc.) toward the person. The security tag system sensors 144 may disable transmitters away from the first exit (beyond the threshold distance) to reduce interference.

In another implementation, the mmWave sensor 142 may detect the person approaching the exit. When the person is within a threshold distance (e.g., 1 m, 2 m, 5 m, etc.) from the mmWave sensor 142 and/or the exit, the security tag system sensors 144 may trigger the interrogation of the security tag 124.

Again, as discussed above, other technology may be used in place of or in addition to the mmWave technology. For example, using one or more cameras 120, the security tag system sensors 144 may be able to increase the number of reads on the person. A person tracking application may be used to analyze the camera feature to assist in tracking the person as the person exits the store. In one or more embodiments, one or more motion detection sensors, infrared sensors, lasers or any other sensor capable of detecting and/or tracking a person may be used to track the person exiting the store.

Figure 2:
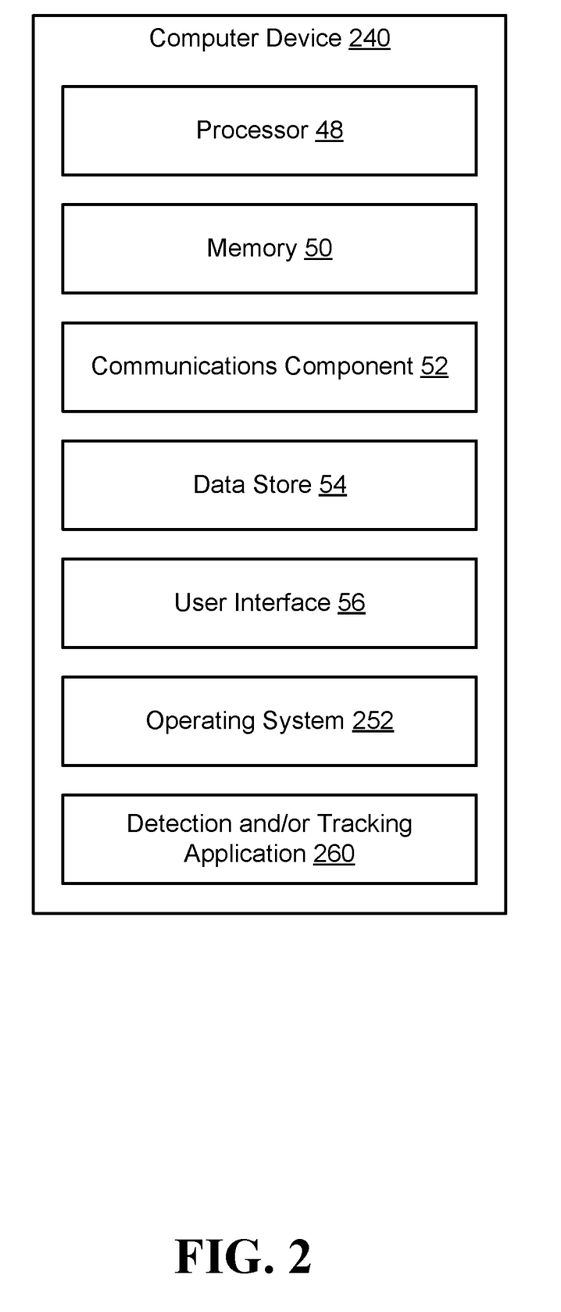
FIG. 2 is a schematic block diagram of an example computer device, in accordance with an implementation of the present disclosure.

Referring now to FIG. 2, illustrated is an example computer device 240 in accordance with an implementation, including additional component details as compared to FIG. 1. The computer device 240 may be an example of the evaluation computer 126 of FIG. 1. In one example, computer device 240 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 242.

In an example, computer device 240 may include memory 50 for storing instructions executable by the processor 48 for carrying out the functions described herein. In an implementation, for example, memory 50 may include memory 244. The memory 50 may include instructions for executing a detection and/or tracking application 260 for executing the methods.

Further, computer device 240 may include a communications component 52 that provides for establishing and maintaining communications with one or more parties utilizing hardware, software, and services as described herein. Communications component 52 may carry communications between components on computer device 240, as well as between computer device 240 and external devices, such as devices located across a communications network and/or devices serially or locally connected to computer device 240. For example, communications component 52 may include one or more buses, and may further include transmit chain components and receive chain components associated with a transmitter and receiver, respectively, operable for interfacing with external devices.

Additionally, computer device 240 may include a data store 54, which can be any suitable combination of hardware and/or software, that provides for mass storage of information, databases, and programs employed in connection with implementations described herein. For example, data store 54 may be a data repository for operating system 252 and/or detection and/or tracking application 260. The data store may include memory 244 and/or storage device 246.

Computer device 240 may also include a user interface component 56 operable to receive inputs from a user of computer device 240 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 252 and/or metal foil defection application 260. In addition, processor 48 may execute operating system 252 and/or detection and/or tracking application 260, and memory 50 or data store 54 may store them.

Figure 3:
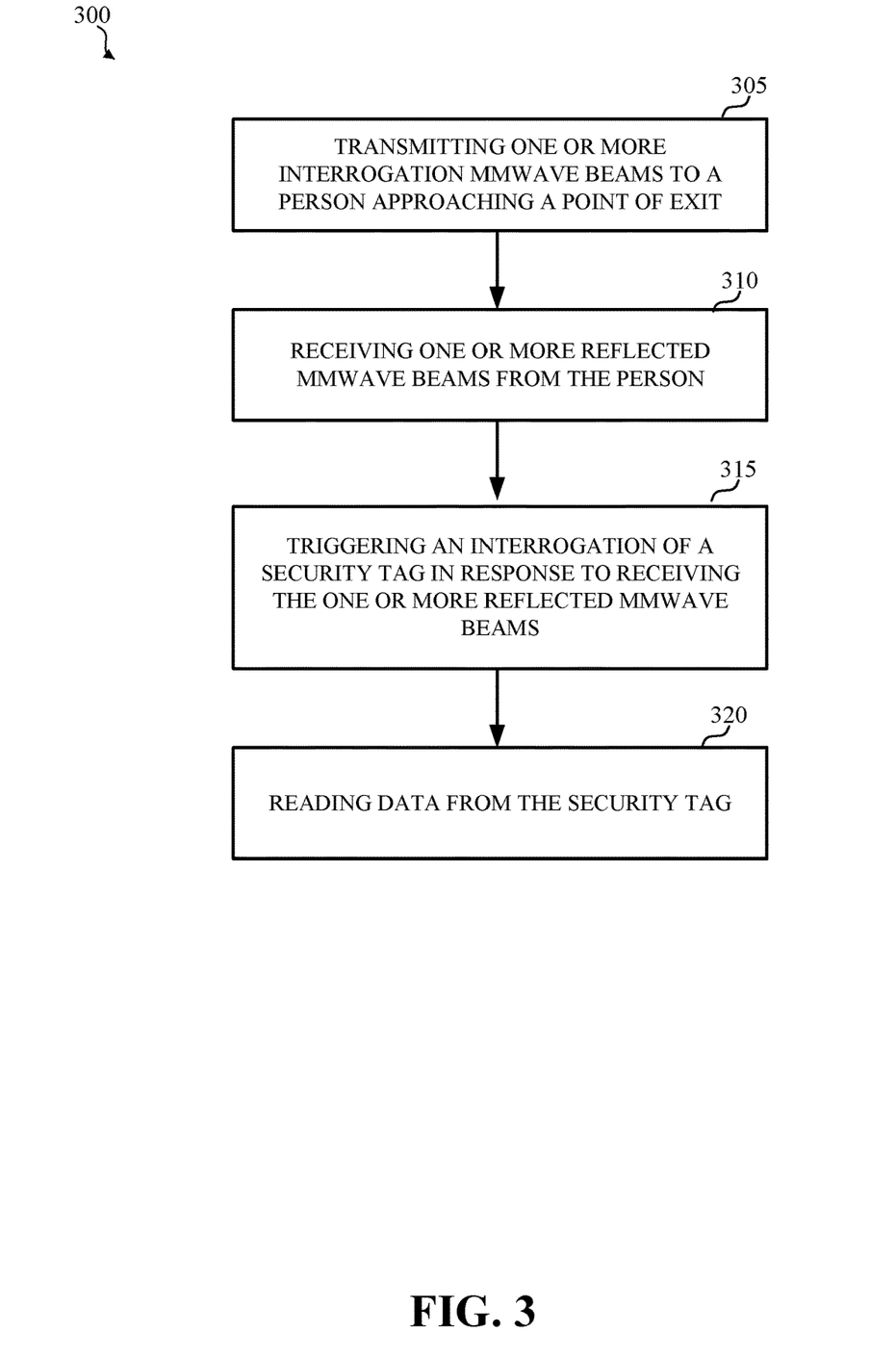
FIG. 3 is a flow diagram of an example of a method for interrogating a security tag, in accordance with an implementation of the present disclosure.

Referring now to FIG. 3, in some implementations, a method 300 of interrogating a security tag may be performed by the exit system 140, the computer device 240, and/or the mmWave sensors 142. The exit system 140, the computer device 240, and/or the mmWave sensors 142 may be configured to and/or define means for performing the steps below.

At block 305, the method 300 may transmit one or more interrogation mmWave beams to a person approaching a point of exit. For example, the exit system 140, the computer device 240, and the mmWave sensors 142 may transmit one or more interrogation mmWave beams to a person approaching a point of exit as described above.

At block 310, the method 300 may receive one or more reflected mmWave beams from the person. For example, the mmWave sensors 142 may receive one or more reflected mmWave beams from the person as described above.

At block 315, the method 300 may trigger an interrogation of a security tag in response to receiving the one or more reflected mmWave beams. For example, the exit system 140 and/or the computer device 240 may trigger an interrogation of a security tag in response to receiving the one or more reflected mmWave beams as described above.

At block 320, the method 300 may read data from the security tag. For example, the exit system 140 and/or the computer device 240 may read data from the security tag as described above.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A system for interrogating a person exiting a store, comprising:
   one or more pedestals positioned to define an exit portal leading to a point of exit;
   one or more mmWave sensors, fixedly positioned near the point of exit, configured to receive one or more reflected mmWave beams from a person approaching the point of exit and triggering an interrogation of a security tag;
   one or more security tag readers, fixedly positioned with the one or more pedestals, configured to read data from the security tag passing through the exit portal in response to triggering the interrogation; and
   an exit system configured to:
     steer beams of a first subset of the one or more security tag readers toward the person; and
     disable a second subset of the one or more security tag readers, wherein the second subset include security tag readers beyond a threshold distance from the point of exit.

2. The system of claim 1, wherein the one or more security tag readers are further configured to steer one or more reader beams of the one or more security tag readers toward the person.

3. The system of claim 1, wherein each of the one or more security tag readers is further configured to:
   transmit a plurality of interrogation signals; and
   receive a plurality of response signals in response to the plurality of interrogation signals transmitted.

4. The system of claim 1, wherein:
   the one or more mmWave sensors are further configured to determine at least a distance between the one or more mmWave sensors and the person.

5. The system of claim 4, wherein the one or more security tag readers are further configured to read the data from the security tag when the distance is below a threshold.

6. A method of interrogating a person exiting a store, comprising:
   transmitting one or more interrogation mmWave beams to a person approaching a point of exit;
   receiving one or more reflected mmWave beams from the person;
   triggering an interrogation of a security tag in response to receiving the one or more reflected mmWave beams; and
   reading data from the security tag;
   wherein triggering the interrogation of the security tag comprises:
     steering beams of a first subset of the one or more security tag readers toward the person; and
     disabling a second subset of the one or more security tag readers, wherein the second subset include security tag readers beyond a threshold distance from the point of exit.

7. The method of claim 6, wherein triggering the interrogation of the security tag comprises steering one or more beams of one or more security tag readers toward the person.

8. The method of claim 6, wherein triggering the interrogation of the security tag comprises:
   transmitting a plurality of interrogation signals; and
   receiving a plurality of response signals in response to the plurality of interrogation signals.

9. The method of claim 6, further comprising:
   determining at least a distance between the one or more mmWave sensors and the person.

10. The method of claim 9, wherein reading the data comprises reading the data from the security tag in response to the distance being below a threshold.

11. The method of claim 9, further comprises suspending the interrogation in response to the first distance being above a threshold.

12. A non-transitory computer readable medium comprising instructions that, when executed by one or more processors, cause the one or more processors to:
   cause one or more mmWave transmitters to transmit one or more interrogation mmWave beams to a person approaching a point of exit;
   cause one or more mmWave sensors to receive one or more reflected mmWave beams from the person;
   triggering an interrogation of a security tag in response to receiving the one or more reflected mmWave beams;
   reading data from the security tag;
   steering beams of a first subset of the one or more security tag readers toward the person; and
   disabling a second subset of the one or more security tag readers, wherein the second subset include security tag readers beyond a threshold distance from the point of exit.

13. The non-transitory computer readable medium of claim 12, wherein the instructions for triggering the interrogation comprises instructions for steering one or more beams of one or more security tag readers toward the person.

14. The non-transitory computer readable medium of claim 12, wherein the instructions for triggering the interrogation comprises instructions for:
   transmitting a plurality of interrogation signals; and
   receiving a plurality of response signals in response to the plurality of interrogation signals.

15. The non-transitory computer readable medium of claim 12, further comprising instructions for:
   determining at least a distance between the one or more mmWave sensors and the person.

16. The non-transitory computer readable medium of claim 15, wherein the instructions reading the data comprises instructions for reading the data from the security tag in response to the distance being below a threshold.

17. The non-transitory computer readable medium of claim 15, further comprising instructions for suspending the interrogation in response to the first distance being above a threshold.

* * * * *